US010831677B2

(12) United States Patent
Xu et al.

(10) Patent No.: US 10,831,677 B2
(45) Date of Patent: Nov. 10, 2020

(54) CACHE MANAGEMENT METHOD, CACHE CONTROLLER, AND COMPUTER SYSTEM

(71) Applicant: Huawei Technologies Co., Ltd., Shenzhen (CN)

(72) Inventors: Jun Xu, Hangzhou (CN); Yongbing Huang, Beijing (CN); Yuangang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/028,265

(22) Filed: Jul. 5, 2018

(65) Prior Publication Data

US 2018/0314646 A1    Nov. 1, 2018

Related U.S. Application Data

(63) Continuation of application No. PCT/CN2016/070230, filed on Jan. 6, 2016.

(51) Int. Cl.
*G06F 12/121* (2016.01)
*G06F 12/122* (2016.01)
(Continued)

(52) U.S. Cl.
CPC .............. *G06F 12/121* (2013.01); *G06F 3/06* (2013.01); *G06F 12/0804* (2013.01);
(Continued)

(58) Field of Classification Search
CPC .............. G06F 1/00–3296; G06F 3/00; G06F 3/06–0689; G06F 5/00–16;
(Continued)

(56) References Cited

U.S. PATENT DOCUMENTS 6,813,691 B2 * 11/2004 Gaither ............... G06F 12/0804
707/999.002
7,546,417 B1   6/2009 Rajamony et al.
(Continued)

FOREIGN PATENT DOCUMENTS

CN    103246616 A    8/2013
CN    103873562 A    6/2014
(Continued)

OTHER PUBLICATIONS

Machine translation of CN 105094686; Wei et al; Nov. 25, 2015; retrieved from https://patents.google.com/patent/CN105094686A/en?oq=CN105094686 on Sep. 5, 2019 (Year: 2015).*
(Continued)

*Primary Examiner* — Daniel C. Chappell
(74) *Attorney, Agent, or Firm* — Womble Bond Dickinson (US) LLP

(57) ABSTRACT

A cache management method, a cache controller, and a computer system are provided. In the method, the cache controller obtains an operation instruction; when a destination address in the operation instruction hits no cache line cache line in a cache of the computer system, and the cache includes no idle cache line, the cache controller selects a to-be-replaced cache line from a replacement set, where the replacement set includes at least two cache lines; and the cache controller eliminates the to-be-replaced cache line from the cache, and stores, in the cache, a cache line obtained from the destination address. According to the cache management method, system overheads of cache line replacement can be reduced, and cache line replacement efficiency can be improved.

9 Claims, 5 Drawing Sheets

(51) Int. Cl.
*G06F 12/0804* (2016.01)
*G06F 12/0871* (2016.01)
*G06F 3/06* (2006.01)

(52) U.S. Cl.
CPC ........ *G06F 12/0871* (2013.01); *G06F 12/122* (2013.01); *G06F 2212/1021* (2013.01)

(58) Field of Classification Search
CPC ........... G06F 8/00–78; G06F 9/00–548; G06F 11/00–3696; G06F 12/00–16; G06F 13/00–4295; G06F 15/00–825; G06F 16/00–986; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 8,712,984 | B2 * | 4/2014 | Zhang | G06F 3/061 707/705 |
| 8,914,582 | B1 * | 12/2014 | Trimble | G06F 12/126 711/136 |
| 8,996,812 | B2 * | 3/2015 | Kornegay | G06F 12/0817 711/122 |
| 9,405,706 | B2 * | 8/2016 | Doshi | G06F 9/3887 |
| 9,720,835 | B1 * | 8/2017 | Shilane | G06F 12/0833 |
| 9,892,044 | B1 * | 2/2018 | Wallace | G06F 12/0833 |
| 9,892,045 | B1 * | 2/2018 | Douglis | G06F 12/0833 |
| 9,921,963 | B1 * | 3/2018 | Li | G06F 12/0833 |
| 9,965,394 | B2 * | 5/2018 | Romanovskiy | G06F 3/0661 |
| 10,185,666 | B2 * | 1/2019 | van Greunen | G06F 12/12 |
| 10,585,798 | B2 * | 3/2020 | Gray | G06F 12/0897 |
| 2006/0041720 | A1 * | 2/2006 | Hu | G06F 12/0811 711/136 |
| 2009/0031084 | A1 * | 1/2009 | Matick | G06F 12/122 711/136 |
| 2013/0151778 | A1 * | 6/2013 | Daly | G06F 12/0897 711/122 |
| 2013/0151780 | A1 * | 6/2013 | Daly | G06F 12/0897 711/122 |
| 2014/0095775 | A1 * | 4/2014 | Talagala | G06F 12/0246 711/103 |
| 2015/0067264 | A1 | 3/2015 | Eckert et al. | |
| 2016/0062916 | A1 * | 3/2016 | Das | G06F 12/128 711/133 |
| 2016/0267018 | A1 * | 9/2016 | Shimizu | G06F 12/126 |
| 2017/0060752 | A1 | 3/2017 | Wei et al. | |
| 2017/0168942 | A1 * | 6/2017 | Bernat | G06F 12/0833 |
| 2019/0004970 | A1 * | 1/2019 | Pham | G06F 3/0652 |
| 2019/0087344 | A1 * | 3/2019 | Hijaz | G06F 12/0891 |

FOREIGN PATENT DOCUMENTS

| | | | |
|---|---|---|---|
| CN | 104077242 | A | 10/2014 |
| CN | 104123243 | A | 10/2014 |
| CN | 104156322 | A | 11/2014 |
| CN | 105094686 | A * | 11/2015 |
| CN | 105094686 | A | 11/2015 |
| EP | 3121703 | A1 | 1/2017 |
| JP | H09212421 | A | 8/1997 |

OTHER PUBLICATIONS

High Performance Cache Replacement Using Re-Reference Interval Prediction (RRIP); Jaleel et al; 2010; retrieved from https://people.csail.mit.edu/emer/papers/2010.06.isca.rrip.pdf on Apr. 22, 2020 (Year: 2010).*

Kharbutli et al., "Counter-Based Cache Replacement Algorithms", Proceedings of the International Conference on Computer Design, Oct. 2-5, 2005, 9 pages.

* cited by examiner

CACHE MANAGEMENT METHOD, CACHE CONTROLLER, AND COMPUTER SYSTEM

CROSS-REFERENCE TO RELATED APPLICATIONS

This application is a continuation of International Application No. PCT/CN2016/070230 filed on Jan. 6, 2016, the disclosure of which is hereby incorporated by reference in its entirety.

TECHNICAL FIELD

The present disclosure relates to the communications field, and in particular, to a cache management method, a cache controller, and a computer system.

BACKGROUND

A main idea of a cache technology is to place frequently-used data from a storage medium (for example, a disk) into a cache. Because a read/write speed of a cache is much higher than that of a disk, access efficiency of an entire system can be improved.

Generally, a cache has relatively good performance but a limited capacity, and can cache only some accessed data. It is necessary to try to hit, in the cache, a file related to a read/write operation that is about to occur, so as to allow better cache efficiency. There are two main aspects of cache management: how to select data to be cached in a cache (that is, cache insertion) and how to select to-be-replaced cache data (that is, cache replacement).

The prior art provides a cache management algorithm that is based on a statistical count, to add one counter for each cache line. The counter is used to count a quantity of access requests for accessing a cache line within a time interval, that is, is used to collect statistics on an access count of the cache line. In the prior art, two cache line replacement algorithms are implemented based on an access counter. In a first algorithm, a time interval is defined as a time interval between two consecutive times of accessing a cache line. After a value of the access counter exceeds a threshold $\Delta thd$, the cache line is used as a to-be-replaced target. In a second algorithm, a time interval is defined as a time interval starting from time when a cache line is added to a cache to current time. Likewise, after the value of the access counter exceeds a threshold LT, the cache line is used as a to-be-replaced target.

In the prior art, if data that currently needs to be read/written misses a cache line in a cache, a controller extracts the data from a storage medium and uses the data as a new cache line ready to put into the cache. In this case, if a quantity of cache lines stored in the cache has reached an upper limit, a cache line needs to be deleted from original cache lines.

The controller traverses counters of all original cache lines to learn a quantity of access requests of each cache line or an access time interval of each cache line, so as to select a cache line with a minimum quantity of access requests or a longest access time interval, and delete the cache line while putting a new cache line into the cache.

Therefore, in the prior art, in a cache line replacement process, a controller needs to traverse all original cache lines, and select a to-be-replaced cache line according to a calculation rule. Consequently, relatively large system overheads are caused, and cache line replacement efficiency is affected.

SUMMARY

Embodiments of the present disclosure provide a cache management method, a cache controller, and a computer system, to effectively reduce system overheads of cache line replacement, and improve cache line replacement efficiency.

A first aspect of the embodiments of the present disclosure provides a cache management method applied to a computer system. In this method, a cache controller obtains an operation instruction sent by a CPU, the operation instruction carries a destination address, and the destination address is an address that is in a memory and that is to be accessed by the CPU. In this case, if the cache controller does not find, in any cache line cache line in a cache of the computer system, a cache line that matches the destination address, that is, the destination address misses a cache line, and there is no idle cache line in the cache, the cache controller selects a to-be-replaced cache line from a pre-obtained replacement set for replacement. It should be noted herein that the replacement set includes at least two cache lines. The cache controller eliminates the selected to-be-replaced cache line from the cache. Then, the cache controller stores, in the cache, a cache line obtained from the destination address, to complete cache line replacement.

In the prior art, each time the destination address misses a cache line, the cache controller needs to traverse cache lines to find a to-be-replaced cache line; however, in the embodiments of the present disclosure, the cache controller can directly select a to-be-replaced cache line from the replacement set for replacement when the destination address misses a cache line. This effectively reduces system overheads of cache line replacement, and improves efficiency.

In a possible design, before the cache controller selects a to-be-replaced cache line from the replacement set, the cache controller may pre-obtain an access frequency count of each cache line in the cache, and divide an access frequency count range of a cache line into multiple access frequency segments according to a preset division policy. After determining, according to the access frequency count of each cache line, an access frequency segment to which each cache line belongs, the cache controller may select, from cache lines corresponding to the multiple access frequency segments, a to-be-replaced cache line according to a quantity M of to-be-replaced cache lines, to obtain the replacement set, and M is an integer that is not less than 2.

Optionally, in the embodiments of the present disclosure, instead of obtaining the multiple access frequency segments by means of division, the cache controller may directly select M to-be-replaced cache lines from cache lines in the cache to obtain the replacement set.

In the embodiments of the present disclosure, the cache controller divides the cache lines into multiple segments. This facilitates to-be-replaced cache line selection performed by the cache controller in unit of segment, and avoids a need to compare access frequency counts of cache lines on a large scale one by one during the to-be-replaced cache line selection, thereby reducing work overheads.

In a possible design, the selecting, by the cache controller from cache lines corresponding to the multiple access frequency segments, a to-be-replaced cache line according to a quantity M of to-be-replaced cache lines includes: successively selecting, by the cache controller in ascending order of access frequency count ranges corresponding to the multiple access frequency segments, a cache line that belongs to each access frequency segment until a quantity of selected cache lines is equal to M.

In the embodiments of the present disclosure, a smaller access frequency count of a cache line represents a smaller quantity of times that the cache line is accessed, and later time at which the cache line is last accessed. Therefore, the cache line can be first replaced. The cache line successively selects, in ascending order of the access frequency count ranges, the cache line that belongs to each access frequency segment, so as to select an optimal replacement set.

In a possible design, the quantity M of to-be-replaced cache lines is determined according to an elimination ratio R and a total quantity of cache lines in the cache, and M is a product of the elimination ratio R and the total quantity of cache lines.

In another possible design, the cache controller may further periodically monitor an elimination frequency parameter, and the elimination frequency parameter includes at least one of a miss rate of each cache line in the cache or a traversal frequency of each cache line in the cache. When the elimination frequency parameter exceeds a first threshold, the cache controller adjusts the elimination ratio R to an elimination ratio R1, and the elimination ratio R1 is greater than the elimination ratio R. When the elimination frequency parameter is less than a second threshold, the cache controller adjusts the elimination ratio R to an elimination ratio R2, the elimination ratio R2 is less than the elimination ratio R, and the second threshold herein is less than the first threshold.

In the embodiments of the present disclosure, the cache controller dynamically adjusts the elimination ratio R according to a traversal rate of a cache line and a miss rate of the cache line, that is, a high miss rate, so that when the cache line has a high miss rate and is frequently traversed, a quantity of to-be-replaced cache lines in the replacement set is increased by raising the elimination ratio R. Alternatively, the cache controller may reduce the elimination ratio R when the cache line has a low miss rate and is less traversed, to reduce the quantity of to-be-replaced cache lines in the replacement set, thereby avoiding overheads caused by frequently selecting cache lines to generate the replacement set.

In a possible design, the selecting, by the cache controller, a to-be-replaced cache line from a replacement set includes: selecting, by the cache controller, a to-be-replaced cache line in ascending order of access frequency counts of cache lines in the replacement set, to achieve optimal cache line utilization.

In another possible design, after obtaining the replacement set, the cache controller may further monitor an access frequency count of a cache line that belongs to the replacement set, and eliminate, from the replacement set, a cache line whose access frequency count is greater than a third threshold within a preset time period. In other words, after obtaining the replacement set, the cache controller may continue to monitor a quantity of times that the cache line in the replacement set is hit. If an access frequency count of a cache line in the replacement set is greater than the third threshold within the preset time period, the cache controller may consider that the cache line is hit by a destination address in a subsequently received operation instruction, and therefore the cache line does not have to be eliminated. In this manner, the cache controller can update a cache line in the replacement set, to prevent some accessed cache lines from being incorrectly eliminated.

In a possible design, the cache controller may obtain the access frequency count of each cache line according to an access count of each cache line. Alternatively, the cache controller may obtain the access frequency count of each cache line according to an access count and access time of each cache line.

A second aspect of the present disclosure provides a cache controller. The cache controller includes a module configured to execute the method described in the first aspect and the various possible designs of the first aspect.

A third aspect of the present disclosure provides a computer system. The computer system includes a processor, a cache, and a cache controller. The processor is configured to send an operation instruction. The cache controller is configured to execute the method described in the first aspect and the various possible designs of the first aspect.

In the embodiments of the present disclosure, the cache controller obtains the operation instruction. The operation instruction carries the destination address, and the destination address is the address that is in the memory and that is to be accessed in the operation instruction. When the destination address hits no cache line cache line in the cache of the computer system, and the cache includes no idle cache line, the cache controller selects the to-be-replaced cache line from the replacement set. The replacement set includes at least two cache lines. The cache controller eliminates the to-be-replaced cache line from the cache; and the cache controller stores, in the cache, the cache line obtained from the destination address. Therefore, in a cache line replacement process, the cache controller only needs to select the to-be-replaced cache line from the replacement set. The replacement set is pre-selected, and this effectively improves cache line replacement efficiency.

According to a fourth aspect of the present disclosure, this application provides a computer program product, including a computer readable storage medium that stores program code. An instruction included in the program code is used to execute at least one method described in the first aspect and the various possible designs of the first aspect.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure.

DETAILED DESCRIPTION

Embodiments of the present disclosure provide a cache management method, a cache controller, and a computer system, to effectively reduce system overheads of cache line replacement, and improve cache line replacement efficiency.

In the specification, claims, and accompanying drawings of the present disclosure, the terms "first", "second", "third", "fourth", and so on (if existent) are intended to distinguish between similar objects but do not necessarily indicate order or sequence. It should be understood that the data termed in such a way are interchangeable in proper circumstances so that the embodiments of the present disclosure described herein can be implemented in other orders than the order illustrated or described herein.

Figure 1:
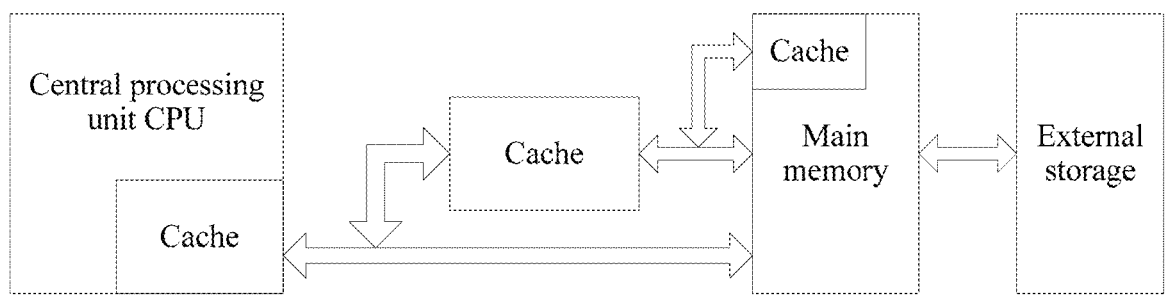
FIG. 1 is a framework diagram of a computer system according to an embodiment of the present disclosure.

Referring to FIG. 1, FIG. 1 is an architecture diagram of a computer system according to an embodiment of the present disclosure. As shown in FIG. 1, a cache is a small-capacity memory between a CPU and a main memory, and an access speed of the cache is quicker than that of the main memory, and is close to that of the CPU. The cache can provide an instruction and data for the CPU at a high speed, to improve an execution speed of a program. A cache technology is an important technology for resolving a problem of a speed mismatch between the CPU and the main memory.

A cache is a buffer memory of a main memory, and includes a high-speed static random access memory (SRAM). The cache may be built into a central processing unit CPU, or may be built into a memory, or the cache may be an independent entity externally existing between a CPU and a memory. All cache control logic is implemented by an internal cache controller. As semiconductor device integration constantly improves, currently a multi-level cache system with at least two levels of caches already emerges, such as an L1 cache (level 1 cache), an L2 cache (level 2 cache), and an L3 cache (level 3 cache).

Currently, a cache capacity is very small, content stored in the cache is only a subset of main memory content, and a data exchange between the CPU and the cache is in unit of word, but a data exchange between the cache and the main memory is in unit of cache line. One cache line includes multiple fixed-length words. When the CPU reads a word in the main memory, a main memory address of the word is sent to the cache and the main memory. In this case, cache control logic determines, according to the address, whether the word currently exists in the cache. If the word currently exists in the cache, the word is immediately transmitted from the cache to the CPU, or if the word currently does not exist in the cache, the word is read from the main memory in a main memory read period to send to the CPU, and an entire cache line that includes this word is read from the main memory to send to the cache. In addition, a cache line in the cache is replaced by using a replacement policy, and a replacement algorithm is implemented by a cache management logic circuit.

In the prior art, during cache line replacement, a controller traverses all original cache lines to learn a quantity of access requests of each cache line or an access time interval of each cache line, so as to select a cache line with a minimum quantity of access requests or a longest access time interval, and delete the cache line while putting a new cache line into a cache. In the prior art, system overheads of the cache line replacement are relatively large, and efficiency is not high.

Figure 2:
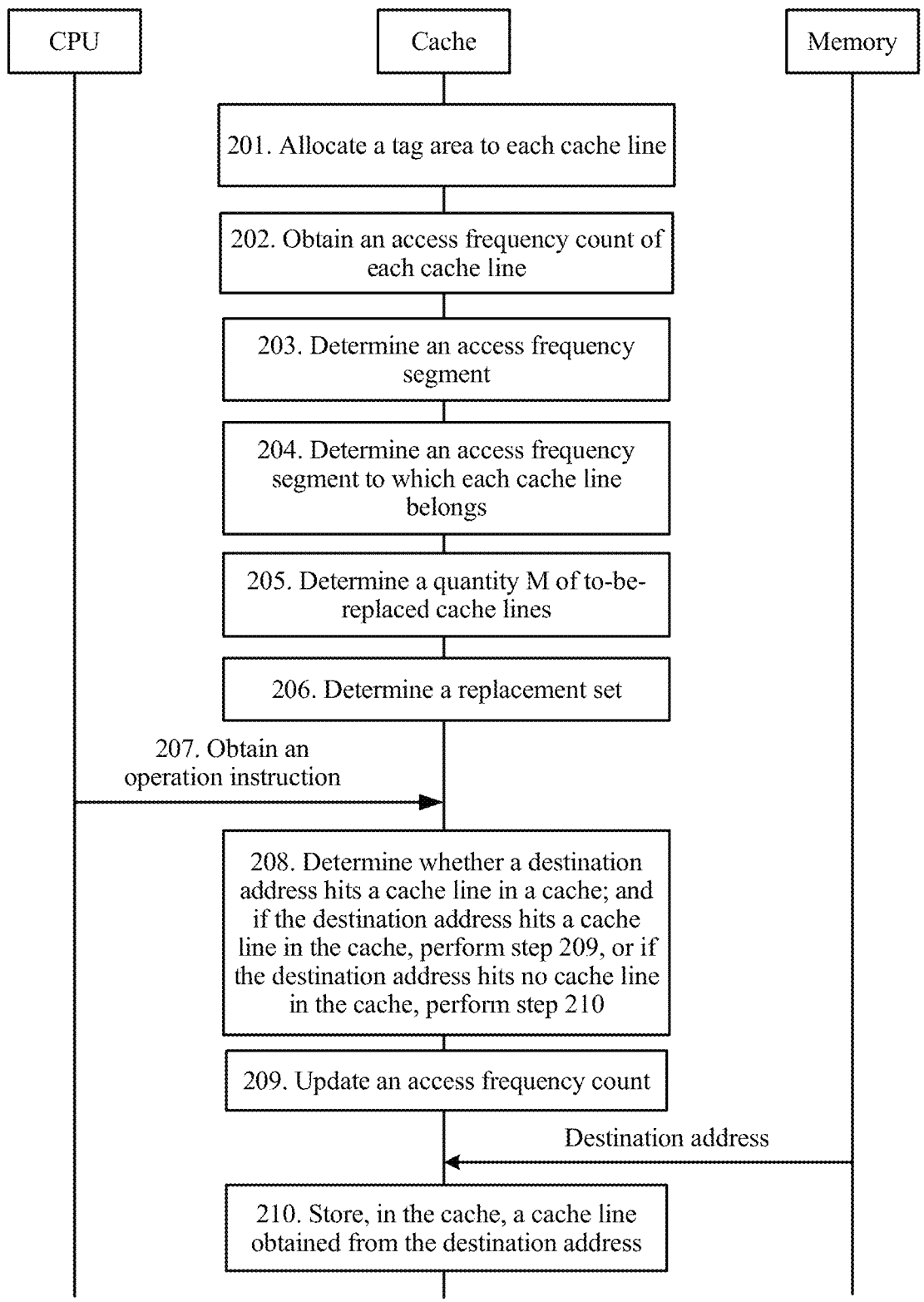
FIG. 2 is a schematic diagram of a cache management method according to an embodiment of the present disclosure.

An embodiment of the present disclosure provides a cache management method. In the cache management method provided in this embodiment of the present disclosure, in each cache line replacement process, there is no need to traverse all original cache lines, and there is no need to select a to-be-replaced cache line by means of calculation. This effectively reduces system overheads, and improves cache line replacement efficiency. For ease of understanding, the following describes, in detail by using a procedure in this embodiment of the present disclosure, a cache management method of the computer system shown in FIG. 1. It may be understood that the cache management method in FIG. 2 may be applied to the cache shown in FIG. 1. Referring to FIG. 2, an embodiment of the cache management method in this embodiment of the present disclosure includes the following steps.

201. A cache controller allocates a tag area to each cache line.

In this embodiment, the cache controller may allocate a data area and a tag area to each cache line. The data area may be used to store actual file data, and the tag area may be used to store a file number, an offset, length information, or data address information that is corresponding to the data area. Details are not described herein.

It should be noted that a storage space size of each area in the data area may be dynamically changed or may be static. In actual application, the cache controller may record a valid character length of the data area in the tag area, to dynamically change a storage space size of the data area. Details are not described herein.

In this embodiment, the cache controller may add an access count counter and an access time counter for each tag area. The access count counter may be used to collect statistics on a quantity of times that a cache line is accessed, and the access time counter may be used to record time at which the cache line is last accessed. The time may be identified by an absolute time value, or may be identified by a quantity of time periods. Details are not limited herein.

It should be noted that the cache controller may collect statistics on an access count for each cache line, or may simultaneously collect statistics on the access count and access time for each cache line. Details are not limited herein.

In this embodiment of the present disclosure, a cache may be built into a CPU, or may be built into a memory, or may be an independent entity. The entity may include a cache controller and a cache line, and composition of the cache line may include a static random access memory (SRAM). Details are not limited herein.

202. The cache controller obtains an access frequency count of each cache line.

In this embodiment, the cache controller may obtain the access frequency count of each cache line by detecting the tag area of each cache line. The access frequency count may include at least one of an access count or access time. Details are not limited herein. For example, in a case, the access frequency count of each cache line may be obtained according to an access count of each cache line. In this case, the access count of a cache line may be used as an access frequency count of the cache line. In another case, alternatively, the access frequency count of each cache line may be obtained according to an access count and access time of each cache line. For example, in actual application, an implementation in which the cache controller may adjust the access frequency count by using the access time may be as follows: The cache controller maps the access time to a time slice, where one time slice includes a short time period, calculates a difference between a current time slice and a time slice in which last access time of the cache line is located, and adjusts the access frequency count according to the time slice difference (for example, Access frequency count=Current access count−Time slice difference×Delta; the Delta value may be statically set according to an empirical value).

It should be noted that the cache controller may update the access count or the access time of each cache line after the cache line is accessed. In actual application, an access time update manner may be recording a current access time, or may be returning the access time counter to zero and restarting counting. Details are not limited herein.

203. The cache controller determines an access frequency segment.

In this embodiment, the cache controller may determine multiple access frequency segments according to the access frequency count of each cache line in the cache and a preset division policy, and each access frequency segment may be corresponding to a different access frequency count range.

In this embodiment, the preset division policy may be as follows: The cache controller first determines a parameter upper limit value and a parameter lower limit value based on the access frequency count of each cache line. The parameter lower limit value may be 0, and the parameter upper limit value may be access_times_max. It should be noted that, in actual application, access_times_max may be a value preset by a user according to experience, or may be obtained by the cache controller by collecting statistics on the access frequency count of each cache line. Details are not limited herein.

It should be noted that, in this embodiment, if an access frequency count of a cache line is greater than access_times_max, the cache controller may determine that the cache line does not need to be replaced.

According to the preset division policy in this embodiment, the cache controller may divide a range from the parameter lower limit value 0 to the parameter upper limit value access_times_max into N access frequency segments after determining the parameter upper limit value and the parameter lower limit value. The value N may be a value entered by the user in advance. It may be understood that, in actual application, a size of each access frequency segment may be a fixed value access_times_max/N, or may be a random value. The random value may be a value randomly generated by the cache controller, or may be a value entered by the user in advance. Details are not limited herein.

It should be noted that, in actual application, a sum of sizes of all access frequency segments is equal to access_times_max.

In this embodiment, the cache controller may further establish a data structure. The data structure is used to record a quantity of cache lines, in each access frequency segment, whose access frequency count belongs to the access frequency segment, or may establish a corresponding data structure for each access frequency segment. Details are not limited herein.

204. The cache controller determines an access frequency segment to which each cache line belongs.

In this embodiment, the cache controller may determine, by traversing cache lines, a target access frequency count range to which the access frequency count of each cache line belongs, and determine a target access frequency segment corresponding to the target access frequency count range to which each cache line belongs. It should be noted that the cache controller may record, by using the data structure, a quantity of cache lines included in each access frequency segment, to collect statistics on the quantity of cache lines in the access frequency segment.

In should be noted that, in actual application, each time determining that one cache line belongs to one access frequency segment, the cache controller may correspondingly adjust a data structure corresponding to the access frequency segment. It may be understood that, in the actual application, each time determining that one cache line belongs to one access frequency segment, the cache controller may increase a quantity recorded by the data structure corresponding to the access frequency segment by a value 1.

205. The cache controller determines a quantity M of to-be-replaced cache lines.

In this embodiment, the cache controller may pre-select M to-be-replaced cache lines according to an elimination ratio R. The to-be-replaced cache lines may be cache lines with a small access frequency count, and the quantity M of to-be-replaced cache lines may be a product of the elimination ratio R and a total quantity of cache lines, and M is an integer not less than 2. It should be noted that, in actual application, the elimination ratio R may be a fixed value, or may be dynamically adjusted by the cache controller. Details are not limited herein.

In this embodiment, the cache controller may determine, by monitoring an elimination frequency parameter in real time, whether the elimination frequency parameter exceeds a first threshold; and if the elimination frequency parameter exceeds the first threshold, the cache controller may adjust the elimination ratio R to an elimination ratio R1, or if the elimination frequency parameter does not exceed the first threshold, the cache controller may further determine whether the elimination frequency parameter is less than a second threshold. If the elimination frequency parameter is less than the second threshold, the cache controller may adjust the elimination ratio R to an elimination ratio R2. It should be noted that if the elimination frequency parameter is not less than the second threshold, the cache controller may continue to monitor the elimination frequency parameter. The first threshold and the second threshold may be values preset by a user, and the first threshold is less than the second threshold.

It should be noted that, in actual application, the cache controller may increase the elimination ratio R by A to obtain the elimination ratio R1, or may decrease the elimination ratio R by A to obtain the elimination ratio R2. The value A may be a value preset by a user.

In this embodiment, the elimination frequency parameter may include at least one of a miss rate of each cache line in the cache or a traversal frequency of each cache line in the cache, and the cache controller may return to continue to monitor the elimination frequency parameter each time after adjusting the elimination ratio R.

206. The cache controller determines a replacement set.

In this embodiment, the cache controller may successively accumulate a cache line in each access frequency segment into the replacement set in ascending order of values corresponding to an access frequency count range until a quantity of cache lines in the replacement set is equal to M. It may be understood that, in actual application, the accumulating, by the cache controller, a cache line in each access frequency segment may include the following steps:

1. The cache controller may determine an access frequency segment whose value corresponding to an access frequency count range is lowest in an access frequency segment group as an accumulative access frequency segment, and the access frequency segment group includes each access frequency segment.

2. The cache controller may remove the accumulative access frequency segment from the access frequency segment group.

3. The cache controller may accumulate a cache line in the accumulative access frequency segment into the replacement set.

4. The cache controller may determine whether a quantity of candidate cache lines in the replacement set is equal to M; and if the quantity of candidate cache lines in the replacement set is equal to M, the cache controller may end a procedure, or if the quantity of candidate cache lines in the replacement set is less than M, the cache controller may determine whether a next access frequency segment to be accumulated into the replacement set is a critical access frequency segment. If the next access frequency segment to be accumulated into the replacement set is not a critical access frequency segment, the cache controller may repeatedly perform steps 1 to 4; or if the next access frequency segment to be accumulated into the replacement set is a critical access frequency segment, the cache controller may randomly select, from the critical access frequency segment, X cache lines to accumulate into the replacement set. X may be a difference between M and a quantity of cache lines that have been accumulated into the replacement set. It should be noted that the critical access frequency segment is such an access frequency segment that before an included cache line of the access frequency segment is accumulated into the replacement set, the quantity of candidate cache lines in the replacement set is less than M and after the included cache line of the access frequency segment is accumulated into the replacement set, the quantity of candidate cache lines in the replacement set is greater than M.

It should be noted that if an accumulative value in a current replacement set does not exceed M, the cache controller may continue to traverse access frequency segments until the accumulative value is greater than or equal to M.

It should be noted that, in actual application, the cache controller may first accumulate each access frequency segment into a set of to-be-eliminated range segments, and then may select, by traversing cache lines, a cache line that belongs to a to-be-eliminated access frequency segment. The cache controller may determine the replacement set by using the selected cache line as a cache line in the replacement set.

207. The cache controller obtains an operation instruction.

The cache controller may receive an operation instruction sent by a CPU. The operation instruction may carry a destination address, and the destination address may be an address that is in a memory and that is to be accessed in the operation instruction.

208. The cache controller determines whether a destination address hits a cache line in a cache; and if the destination address hits a cache line in the cache, the cache controller performs step 209, or if the destination address hits no cache line in the cache, the cache controller performs step 210.

When the CPU reads a word in a main memory, a main memory address of the word may be sent to the cache and the main memory. In this case, the cache controller may determine, according to the address, whether the word currently exists in the cache. It should be noted that, in actual application, the cache controller may first match a cache line outside the replacement set, or may first match a cache line in the replacement set. Details are not limited herein.

209. The cache controller updates an access frequency count.

In this embodiment, the cache controller may update an access frequency count of the cache line after the destination address hits a cache line in the cache. An update manner may be increasing a value of a counter for a tag area of the cache line.

In actual application, the cache controller may further monitor an access frequency count of a cache line in the replacement set in real time, and may eliminate, from the replacement set, a cache line whose access frequency count is greater than a third threshold within a preset time period. For example, the third threshold may be 1. In other words, after obtaining the replacement set, the cache controller may continue to monitor a quantity of times that the cache line in the replacement set is hit. If an access frequency count of a cache line in the replacement set is greater than the third threshold within a preset time period, the cache controller may consider that the cache line is hit by a destination address in a subsequently received operation instruction and may further be accessed, and therefore the cache line does not have to be eliminated. In this manner, the cache controller can update a cache line in the replacement set, to prevent some accessed cache lines from being incorrectly eliminated.

It should be noted that the cache controller completes the step procedure after updating the access frequency count of the cache line.

210. The cache controller stores, in the cache, a cache line obtained from the destination address.

In this embodiment, the cache controller may obtain the destination address from a storage medium after the destination address hits no cache line in the cache, and may write the cache line obtained from the destination address to replace a to-be-replaced cache line selected from the replacement set. It should be noted that, in actual application, the cache controller may first select, in ascending order of values corresponding to access frequency counts, a cache line with a small access frequency count from the replacement set as the to-be-replaced cache line.

It should be noted that the cache controller completes the step procedure after writing the destination address to replace the to-be-replaced cache line in the replacement set.

In a scenario of this embodiment of the present disclosure, the cache includes 10 cache lines, and the cache controller may obtain the access frequency count of each cache line. For details, refer to Table 1.

TABLE 1

| | Cache line | | | | | | | | | |
|---|---|---|---|---|---|---|---|---|---|---|
| | A1 | A2 | A3 | A4 | A5 | B1 | B2 | B3 | B4 | B5 |
| Access frequency count | 1 | 5 | 10 | 12 | 15 | 20 | 20 | 25 | 30 | 35 |

The cache controller may determine a replacement set according to the access frequency count of each cache line in Table 1, and a process thereof is as follows:

The cache controller determines that a lower limit value of the access frequency count is 0 and an upper limit value of the access frequency count is 30, and the cache controller determines that a cache line whose access frequency count is greater than the parameter upper limit 30 does not need to be eliminated.

The cache controller may uniformly divide access frequency counts 0 to 30 into three access frequency segments (that is, a range segment #1 is 0 to 10, a range segment #2 is 11 to 20, and a range segment #3 is 21 to 30).

The cache controller may obtain a quantity of cache lines in each access frequency segment by traversing cache lines. For details, refer to Table 2.

TABLE 2

| | Range segment | | |
|---|---|---|---|
| | Range segment #1 | Range segment #2 | Range segment #3 |
| Access frequency count | 0 to 10 | 11 to 20 | 21 to 30 |
| Quantity of cache lines | 3 | 4 | 2 |
| Cache line | A1, A2, and A3 | A4, A5, B1, and B2 | B3 and B4 |

When the cache controller determines that the elimination ratio R is 50%, the cache controller may learn, by means of calculation, that the quantity M of to-be-replaced cache lines is 5 (M=Total quantity of cache lines×Elimination ratio R=10×50%=5). The cache controller may determine that cache lines A1, A2, and A3 in the range segment #1 may be to-be-replaced cache lines, and the cache controller may determine that the range segment #2 is a critical access frequency segment. A quantity of cache lines that need to be eliminated in the critical access frequency segment, that is, the range segment #2, is 2 (M−Quantity of cache lines in the range segment #1=5−3=2).

Referring to Table 1 and Table 2, the cache controller may accumulate, in ascending order of values corresponding to an access frequency count range, to-be-eliminated cache lines as a replacement set, that is, successively select the cache lines A1, A2, A3, A4, and A5 as the replacement set.

When the destination address hits no cache line in the cache, the cache controller may first select the to-be-replaced cache line A1 with a smallest access frequency count from the replacement set, and write the destination address read from the storage medium to replace the to-be-replaced cache line A1.

In this embodiment of the present disclosure, the cache controller obtains the operation instruction. The operation instruction carries the destination address, and the destination address is the address that is in the memory and that is to be accessed in the operation instruction. If the destination address hits no cache line cache line in the cache, and the cache includes no idle cache line, the cache controller selects the to-be-replaced cache line from the replacement set. The replacement set includes at least two cache lines. The cache controller eliminates the to-be-replaced cache line from the cache; and the cache controller stores, in the cache, the cache line obtained from the memory according to the destination address. Therefore, in a cache line replacement process, the cache controller only needs to select the to-be-replaced cache line from the replacement set. The replacement set is pre-selected, and this effectively improves cache line replacement efficiency.

Different from the embodiment shown in FIG. 2, in an optional solution in an embodiment of the present disclosure, instead of obtaining the access frequency segments by means of division, the cache controller may directly determine the replacement set by using the access frequency count of each cache line.

Figure 3:
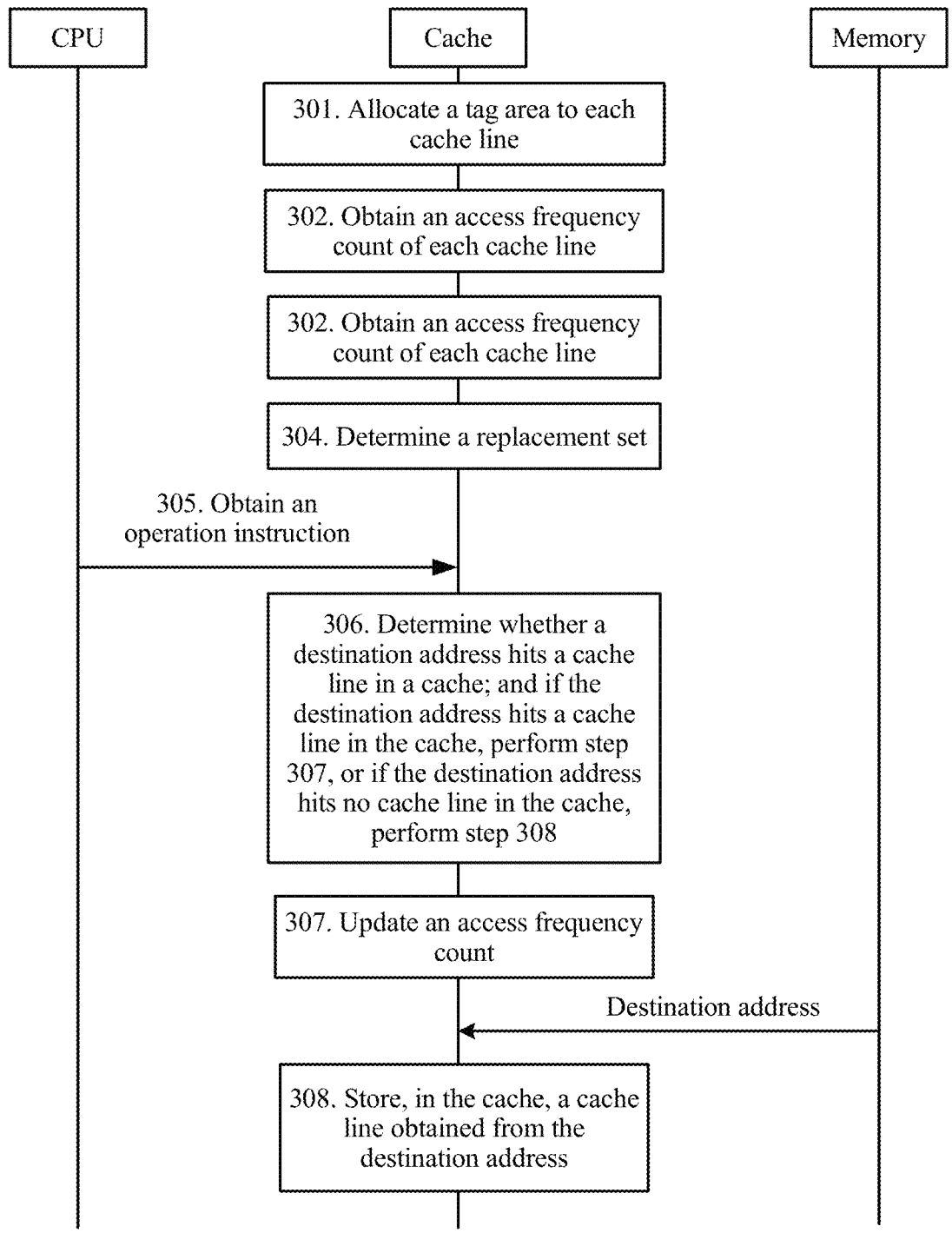
FIG. 3 is another schematic diagram of a cache management method according to an embodiment of the present disclosure.

Referring to FIG. 3, another embodiment of a cache management method in this embodiment of the present disclosure includes the following steps.

Steps 301 and 302 in this embodiment are the same as steps 201 and 202 in the embodiment shown in FIG. 2, and details are not described herein.

Step 303 in this embodiment is the same as step 205 in the embodiment shown in FIG. 2, and details are not described herein again.

304. The cache controller determines a replacement set.

In this embodiment, the cache controller may successively accumulate each cache line into the replacement set in ascending order of values corresponding to an access frequency count range until a quantity of to-be-replaced cache lines in the replacement set is equal to M, and the cache line accumulated into the replacement set is a to-be-replaced cache line.

Steps 305 to 308 in this embodiment are the same as steps 207 to 210 in the embodiment shown in FIG. 2, and details are not described herein again.

Figure 4:
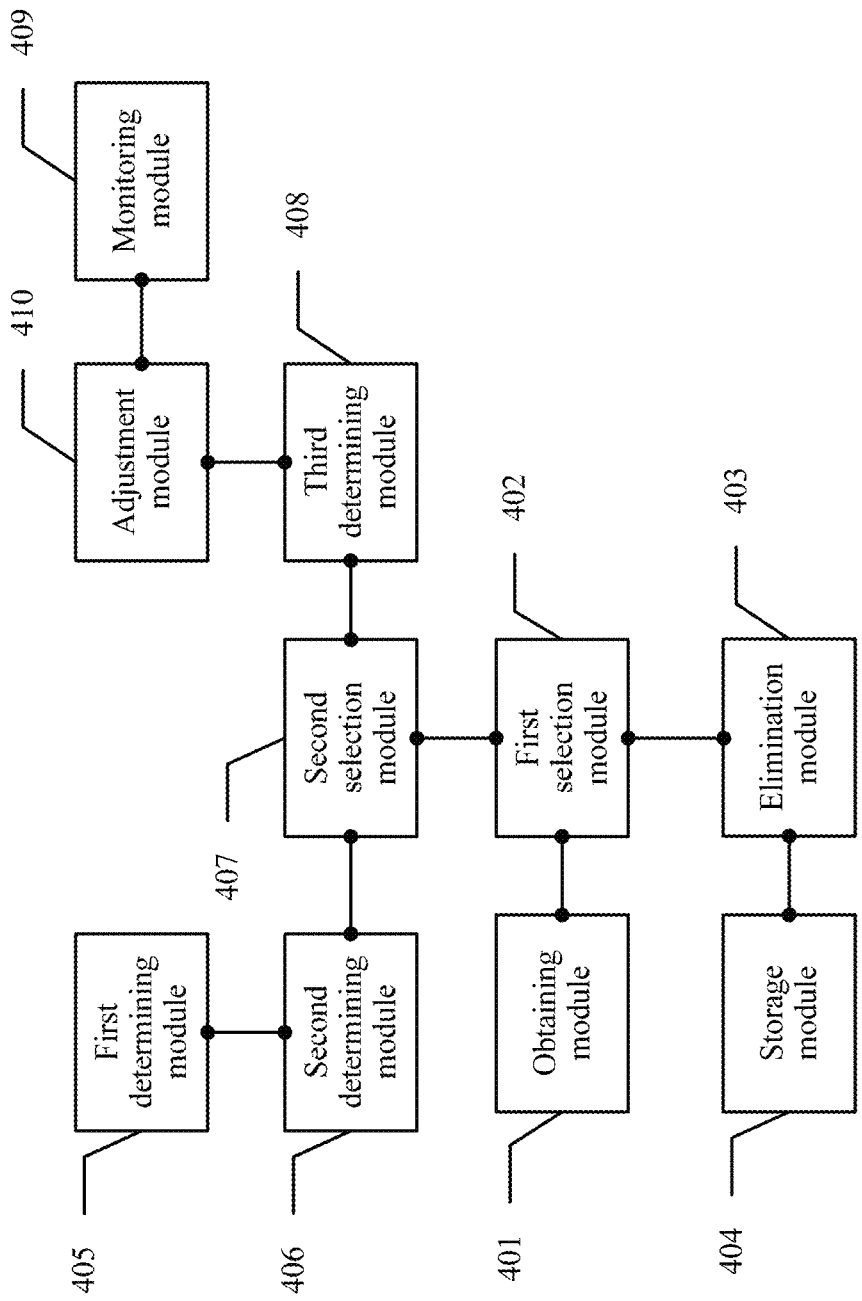
FIG. 4 is a schematic diagram of a cache controller according to an embodiment of the present disclosure.

The foregoing describes the cache management method in this embodiment of the present disclosure, and the following describes a cache controller in an embodiment of the present disclosure. FIG. 4 describes an apparatus embodiment corresponding to the method embodiment in FIG. 2. Referring to FIG. 4, an embodiment of the cache controller in this embodiment of the present disclosure includes:

an obtaining module 401, configured to obtain an operation instruction, where the operation instruction carries a destination address, and the destination address is an address that is to be accessed in the operation instruction;

a first selection module 402, configured to: when the destination address hits no cache line cache line in a cache of a computer system, and the cache includes no idle cache line, select a to-be-replaced cache line from a replacement set, where the replacement set includes at least two cache lines;

an elimination module 403, configured to eliminate the to-be-replaced cache line from the cache; and a storage module 404, configured to store, in the cache, a cache line obtained from the destination address.

The cache controller in this embodiment further includes:

a first determining module 405, configured to determine multiple access frequency segments according to an access frequency count of each cache line in the cache and a preset division policy, where each access frequency segment is corresponding to a different access frequency count range;

a second determining module 406, configured to determine, according to the access frequency count of each cache line in the cache, an access frequency segment to which each cache line belongs; and a second selection module 407, configured to select, from cache lines corresponding to the multiple access frequency segments, a to-be-replaced cache line according to a quantity M of to-be-replaced cache lines, to obtain the replacement set, where M is an integer not less than 2.

In this embodiment, the second selection module 407 is configured to successively select, in ascending order of access frequency count ranges corresponding to the multiple access frequency segments, a cache line that belongs to each access frequency segment until a quantity of selected cache lines is equal to M.

The cache controller in this embodiment further includes:

a third determining module 408, configured to determine the quantity M of to-be-replaced cache lines according to an elimination ratio R and a total quantity of cache lines in the cache, where M is a product of the elimination ratio R and the total quantity of cache lines.

The cache controller in this embodiment may further include:

a monitoring module 409, configured to monitor an elimination frequency parameter, where the elimination frequency parameter includes at least one of a miss rate of each cache line in the cache or a traversal frequency of each cache line in the cache; and an adjustment module 410, configured to: when the elimination frequency parameter exceeds a first threshold, adjust the elimination ratio R to an elimination ratio R1, where the elimination ratio R1 is greater than the elimination ratio R.

The adjustment module 410 is further configured to: when the elimination frequency parameter is less than a second threshold, adjust the elimination ratio R to an elimination ratio R2, where the elimination ratio R2 is less than the elimination ratio R, and the second threshold is less than the first threshold.

The monitoring module 409 is configured to monitor an access frequency count of a cache line that belongs to the replacement set.

The elimination module 403 is configured to eliminate, from the replacement set, a cache line whose access frequency count is greater than a third threshold within a preset time period.

In this embodiment, the obtaining module 401 obtains the operation instruction. The operation instruction carries the destination address, and the destination address is the address that is to be accessed in the operation instruction. When the destination address hits no cache line cache line in the cache of the computer system, and the cache includes no idle cache line, the first selection module 402 selects the to-be-replaced cache line from the replacement set. The replacement set includes at least two cache lines. The elimination module 403 eliminates the to-be-replaced cache line from the cache. The storage module 404 stores, in the cache, the cache line obtained from the destination address. Therefore, in a cache line replacement process, the first selection module 402 only needs to select the to-be-replaced cache line from the replacement set. The replacement set is pre-selected, and this effectively improves cache line replacement efficiency.

Figure 5:
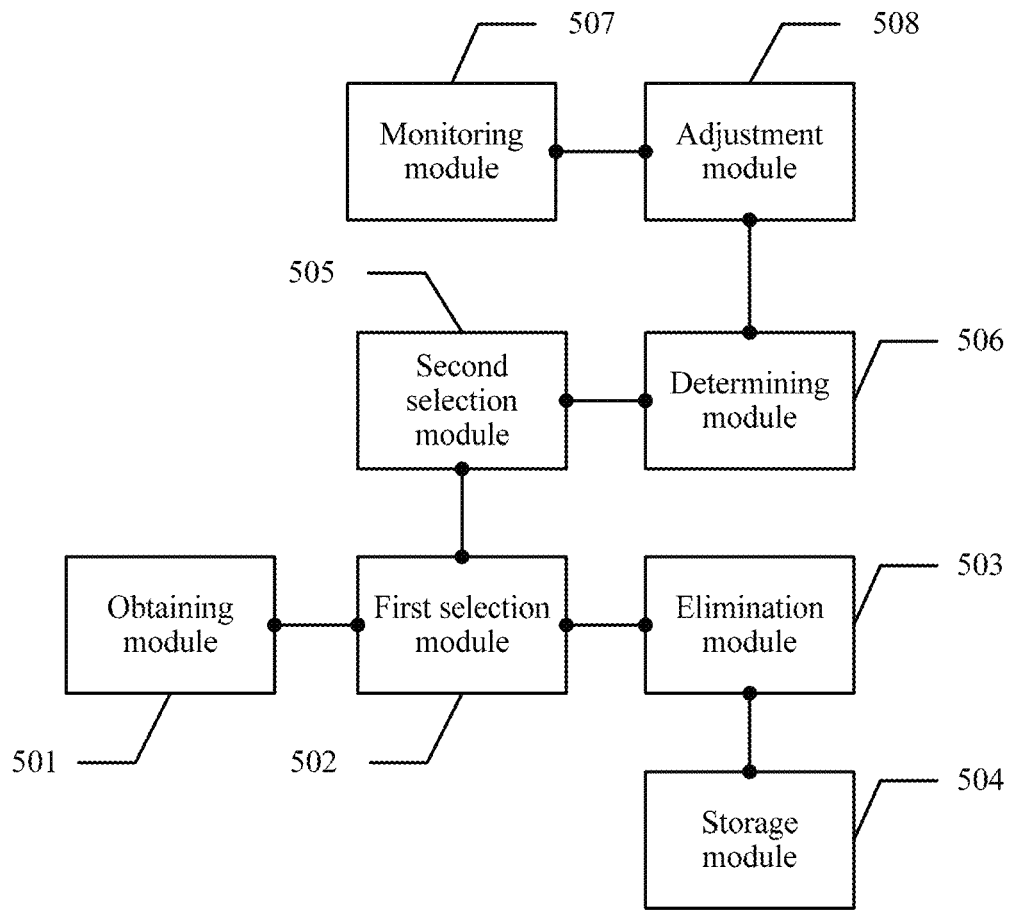
FIG. 5 is a schematic diagram of a cache controller according to an embodiment of the present disclosure.

The foregoing describes the apparatus embodiment corresponding to the method embodiment in FIG. 2, and the following describes an apparatus embodiment corresponding to the method embodiment shown in FIG. 3. Referring to FIG. 5, another embodiment of a cache controller in this embodiment of the present disclosure includes:

an obtaining module 501, configured to obtain an operation instruction, where the operation instruction carries a destination address, and the destination address is an address that is to be accessed in the operation instruction;

a first selection module 502, configured to: when the destination address hits no cache line cache line in a cache of a computer system, and the cache includes no idle cache line, select a to-be-replaced cache line from a replacement set, where the replacement set includes at least two cache lines;

an elimination module 503, configured to eliminate the to-be-replaced cache line from the cache; and a storage module 504, configured to store, in the cache, a cache line obtained from the destination address.

The cache controller in this embodiment further includes:

a second selection module 505, configured to select, from cache lines in the cache, a to-be-replaced cache line according to a quantity M of to-be-replaced cache lines, to obtain the replacement set, where M is an integer not less than 2.

The second selection module 505 in this embodiment is configured to successively select a cache line in ascending order of access frequency count ranges corresponding to cache lines until a quantity of selected cache lines is equal to M.

The cache controller in this embodiment further includes:

a determining module 506, configured to determine the quantity M of to-be-replaced cache lines according to an elimination ratio R and a total quantity of cache lines in the cache, where M is a product of the elimination ratio R and the total quantity of cache lines.

The cache controller in this embodiment may further include:

a monitoring module 507, configured to monitor an elimination frequency parameter, where the elimination frequency parameter includes at least one of a miss rate of each cache line in the cache or a traversal frequency of each cache line in the cache; and an adjustment module 508, configured to: when the elimination frequency parameter exceeds a first threshold, adjust the elimination ratio R to an elimination ratio R1, where the elimination ratio R1 is greater than the elimination ratio R.

The adjustment module 508 is further configured to: when the elimination frequency parameter is less than a second threshold, adjust the elimination ratio R to an elimination ratio R2, where the elimination ratio R2 is less than the elimination ratio R, and the second threshold is less than the first threshold.

The cache controller in this embodiment further includes:

The monitoring module 507 is configured to monitor an access frequency count of a cache line that belongs to the replacement set.

The elimination module 503 is configured to eliminate, from the replacement set, a cache line whose access frequency count is greater than a third threshold within a preset time period.

In this embodiment, the obtaining module 501 obtains the operation instruction. The operation instruction carries the destination address, and the destination address is the address that is to be accessed in the operation instruction. When the destination address hits no cache line cache line in the cache of the computer system, and the cache includes no idle cache line, the first selection module 502 selects the to-be-replaced cache line from the replacement set. The replacement set includes at least two cache lines. The elimination module 503 eliminates the to-be-replaced cache line from the cache. The storage module 504 stores, in the cache, the cache line obtained from the destination address. Therefore, in a cache line replacement process, the selection module 502 only needs to select the to-be-replaced cache line from the replacement set. The replacement set is pre-selected, and this effectively improves cache line replacement efficiency.

Figure 6:
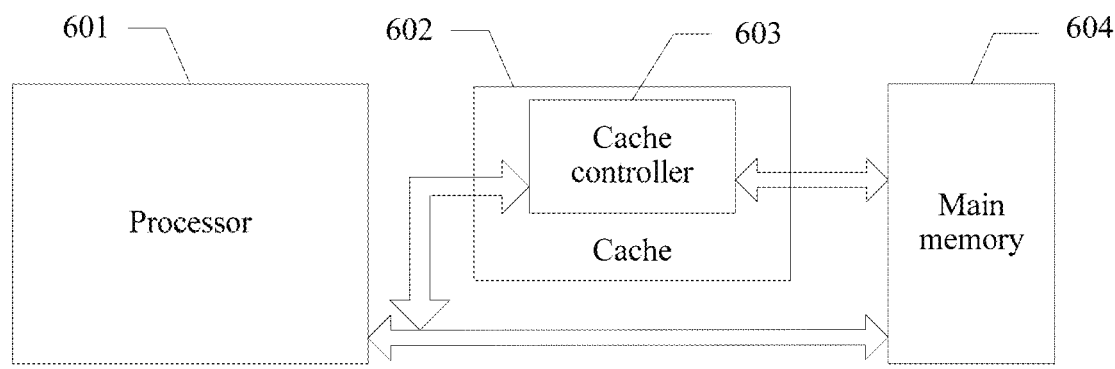
FIG. 6 is a schematic architecture diagram of another computer system according to an embodiment of the present disclosure.

The foregoing describes the cache controller in this embodiment of the present disclosure from a perspective of a modular function entity, and the following describes a computer system in an embodiment of the present disclosure. Referring to FIG. 6, an embodiment of the computer system in this embodiment of the present disclosure includes a processor 601, a cache 602, a cache controller 603, and a memory 604. The cache 602 is configured to cache some data in the memory 604.

In some embodiments of the present disclosure, the processor 601 is configured to send an operation instruction; and the cache controller 603 is configured to:

obtain the operation instruction, where the operation instruction carries a destination address, and the destination address is an address that is to be accessed in the operation instruction;

when the destination address hits no cache line cache line in the cache 602 of the computer system, and the cache includes no idle cache line, select a to-be-replaced cache line from a replacement set, where the replacement set includes at least two cache lines;

eliminate the to-be-replaced cache line from the cache; and store, in the cache 602, a cache line obtained from the destination address.

In some embodiments of the present disclosure, the cache controller 603 is further configured to perform the following steps:

determining multiple access frequency segments according to an access frequency count of each cache line in the cache and a preset division policy, where each access frequency segment is corresponding to a different access frequency count range;

determining, according to the access frequency count of each cache line in the cache, an access frequency segment to which each cache line belongs; and selecting, from cache lines corresponding to the multiple access frequency segments, a to-be-replaced cache line according to a quantity M of to-be-replaced cache lines, to obtain the replacement set, where M is an integer not less than 2.

In some embodiments of the present disclosure, the cache controller 603 is further configured to perform the following step:

successively selecting, in ascending order of access frequency count ranges corresponding to the multiple access frequency segments, a cache line that belongs to each access frequency segment until a quantity of selected cache lines is equal to M.

In some embodiments of the present disclosure, the cache controller 603 is further configured to perform the following steps:

monitoring an elimination frequency parameter, where the elimination frequency parameter includes at least one of a miss rate of each cache line in the cache or a traversal frequency of each cache line in the cache; and when the elimination frequency parameter exceeds a first threshold, adjusting an elimination ratio R to an elimination ratio R1, where the elimination ratio R1 is greater than the elimination ratio R; or when the elimination frequency parameter is less than a second threshold, adjusting an elimination ratio R to an elimination ratio R2, where the elimination ratio R2 is less than the elimination ratio R, and the second threshold is less than a first threshold.

In some embodiments of the present disclosure, the cache controller 603 is further configured to perform the following steps:

monitoring an access frequency count of a cache line that belongs to the replacement set; and eliminating, from the replacement set, a cache line whose access frequency count is greater than a third threshold within a preset time period.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

An embodiment of the present disclosure further provides a computer program product for implementing an access request processing method, including a computer readable storage medium that stores program code, where an instruction included in the program code is used to execute the method procedure described in any one of the foregoing method embodiments. An ordinary person skilled in the art may understand that the foregoing storage medium may include any non-transitory machine-readable medium capable of storing program code, such as a USB flash drive, a removable hard disk, a magnetic disk, an optical disc, a random-access memory (RAM), a solid state disk (SSD), or another non-volatile memory.

It should be noted that the embodiments provided in this application are merely examples. A person skilled in the art may clearly know that, for convenience and conciseness of description, in the foregoing embodiments, the embodiments emphasize different aspects, and for a part not described in detail in one embodiment, reference may be made to relevant description of another embodiment. The embodiments of the present disclosure, claims, and features disclosed in the accompanying drawings may exist independently, or exist in a combination. Features described in a hardware form in the embodiments of the present disclosure may be executed by software, and vice versa. This is not limited herein.

What is claimed is:

1. A cache management method applied to a computer system, the method comprising:

obtaining, by a cache controller, an operation instruction that carries a destination address, wherein the destination address is an address to be accessed in the operation instruction;

determining, by the cache controller, the destination address hits no cache line in a cache of the computer system, and wherein the cache comprises no idle cache line;

determining, by the cache controller, multiple access frequency segments according to an access frequency count of each cache line in the cache, wherein each access frequency segment is corresponding to a different access frequency count range;

determining, by the cache controller according to the access frequency count of each cache line in the cache, an access frequency segment to which each cache line belongs; and selecting, by the cache controller from cache lines corresponding to the multiple access frequency segments, a to-be-replaced cache line according to a quantity M of to-be-replaced cache lines, wherein M is an integer not less than 2, including successively selecting, by the cache controller in ascending order of access frequency count ranges corresponding to the multiple access frequency segments, a cache line that belongs to each access frequency segment until a quantity of selected cache lines is equal to M, wherein the least frequency accessed candidate cache line is used as the first element in ascending order, wherein, the quantity M of to-be-replaced cache lines is determined according to an elimination ratio R and a total quantity of cache lines in the cache, wherein M is a product of the elimination ratio R and the total quantity of cache lines, further including:

monitoring, by the cache controller, an elimination frequency parameter, wherein the elimination frequency parameter comprises at least one of a miss rate of each cache line in the cache or a traversal frequency of each cache line in the cache, determining, by the cache controller, the elimination frequency parameter exceeds a first threshold, and adjusting, by the cache controller, the elimination ratio R to an elimination ratio R1, wherein the elimination ratio R1 is greater than the elimination ratio R; and the method further comprises: monitoring, by the cache controller, the elimination frequency parameter, wherein the elimination frequency parameter comprises at least one of a miss rate of each cache line in the cache or a traversal frequency of each cache line in the cache, determining, by the cache controller, the elimination frequency parameter is less than a second threshold, and adjusting, by the cache controller, the elimination ratio R to an elimination ratio R2, wherein the elimination ratio R2 is less than the elimination ratio R eliminating, by the cache controller, the to-be-replaced cache line from the cache; and storing, by the cache controller in the cache, a cache line obtained according to the destination address.

2. The cache management method according to claim 1, wherein the access frequency count of each cache line is obtained according to an access count of each cache line.

3. The cache management method according to claim 1, wherein the access frequency count of each cache line is obtained according to an access count and access time of each cache line.

4. The method according to claim 1, further comprising:
monitoring, by the cache controller, an access frequency count of a cache line that belongs to the replacement set; and
eliminating, by the cache controller from the replacement set, a cache line whose access frequency count is greater than a third threshold within a preset time period.

5. A computer system, comprising:
a cache;
a processor configured to send an operation instruction; and
a cache controller configured to:
  obtain the operation instruction that carries a destination address, wherein the destination address is an address to be accessed in the operation instruction,
  determine the destination address hits no cache line in the cache of the computer system, and the cache comprises no idle cache line,
  determine, by the cache controller, multiple access frequency segments according to an access frequency count of each cache line in the cache, wherein each access frequency segment is corresponding to a different access frequency count range,
  determine, by the cache controller according to the access frequency count of each cache line in the cache, an access frequency segment to which each cache line belongs, and
  select from cache lines corresponding to the multiple access frequency segments, a to-be-replaced cache line according to a quantity M of to-be-replaced cache lines, wherein M is an integer not less than 2, including successively selecting, by the cache controller in ascending order of access frequency count ranges corresponding to the multiple access frequency segments, a cache line that belongs to each access frequency segment until a quantity of selected cache lines is equal to M, wherein the least frequency accessed candidate cache line is used as the first element in ascending order, wherein, the quantity M of to-be-replaced cache lines is determined according to an elimination ratio R and a total quantity of cache lines in the cache, wherein M is a product of the elimination ratio R and the total quantity of cache lines, further including:
    monitoring, by the cache controller, an elimination frequency parameter, wherein the elimination frequency parameter comprises at least one of a miss rate of each cache line in the cache or a traversal frequency of each cache line in the cache,
    determining, by the cache controller, the elimination frequency parameter exceeds a first threshold, and adjusting, by the cache controller, the elimination ratio R to an elimination ratio R1, wherein the elimination ratio R1 is greater than the elimination ratio R; wherein the cache controller is further configured to: monitor the elimination frequency parameter, wherein the elimination frequency parameter comprises at least one of a miss rate of each cache line in the cache or a traversal frequency of each cache line in the cache, determine the elimination frequency parameter is less than a second threshold, and adjust the elimination ratio R to an elimination ratio R2, wherein the elimination ratio R2 is less than the elimination ratio R
    eliminate the to-be-replaced cache line from the cache, and
    store, in the cache, a cache line obtained from the destination address.

6. The computer system according to claim 5, wherein the cache controller is further configured to:
monitor an access frequency count of a cache line that belongs to the replacement set; and
eliminate, from the replacement set, a cache line whose access frequency count is greater than a third threshold within a preset time period.

7. The computer system according to claim 5, wherein the cache controller is further configured to:
obtain the access frequency count of each cache line according to an access count of each cache line.

8. The computer system according to claim 5, wherein the cache controller is further configured to:
obtain the access frequency count of each cache line according to an access count and access time of each cache line.

9. A cache controller, comprising:
a processor; and
a memory comprising a plurality of computer-executable instructions stored thereon which, when executed by the processor, cause the cache controller to:
obtain an operation instruction that carries a destination address, and wherein the destination address is an address to be accessed in the operation instruction,
determine the destination address hits no cache line in a cache, and the cache comprises no idle cache line,
determine, by the cache controller, multiple access frequency segments according to an access frequency count of each cache line in the cache, wherein each access frequency segment is corresponding to a different access frequency count range,
determine, by the cache controller according to the access frequency count of each cache line in the cache, an access frequency segment to which each cache line belongs, and
select from cache lines corresponding to the multiple access frequency segments, a to-be-replaced cache line according to a quantity M of to-be-replaced cache lines, wherein M is an integer not less than 2, including successively selecting, by the cache controller in ascending order of access frequency count ranges corresponding to the multiple access frequency segments, a cache line that belongs to each access frequency segment until a quantity of selected cache lines is equal to M, wherein the least frequency accessed candidate cache line is used as the first element in ascending order, wherein, the quantity M of to-be-replaced cache lines is determined according to an elimination ratio R and a total quantity of cache lines in the cache, wherein M is a product of the elimination ratio R and the total quantity of cache lines, further including:

monitoring, by the cache controller, an elimination frequency parameter, wherein the elimination frequency parameter comprises at least one of a miss rate of each cache line in the cache or a traversal frequency of each cache line in the cache, determining, by the cache controller, the elimination frequency parameter exceeds a first threshold, and adjusting, by the cache controller, the elimination ratio R to an elimination ratio R1, wherein the elimination ratio R1 is greater than the elimination ratio R; wherein the computer-executable instructions when executed by the processor, further cause the cache controller to: monitor the elimination frequency parameter, wherein the elimination frequency parameter comprises at least one of a miss rate of each cache line in the cache or a traversal frequency of each cache line in the cache, determine the elimination frequency parameter is less than a second threshold, and adjust the elimination ratio R to an elimination ratio R2, wherein the elimination ratio R2 is less than the elimination ratio R eliminate the to-be-replaced cache line from the cache, and store, in the cache, a cache line obtained from the destination address.

* * * * *